(12) United States Patent
Liu

(10) Patent No.: US 10,670,165 B2
(45) Date of Patent: Jun. 2, 2020

(54) AUTOMATIC WATER REGULATOR

(71) Applicant: Zhongshan Style Electric Appliances Technology Co, Ltd, Guangdong (CN)

(72) Inventor: Tao Liu, Guangdong (CN)

(73) Assignee: Zhongshan Style Electric Appliances Technology Co, Ltd, Guangdong (CN)

( * ) Notice: Subject to any disclaimer, the term of this patent is extended or adjusted under 35 U.S.C. 154(b) by 0 days.

(21) Appl. No.: 16/241,919

(22) Filed: Jan. 7, 2019

(65) Prior Publication Data

US 2019/0226600 A1    Jul. 25, 2019

(30) Foreign Application Priority Data

Jan. 23, 2018    (CN) .................... 2018 2 0109137 U

(51) Int. Cl.
*F16K 31/26*    (2006.01)
*F16K 15/02*    (2006.01)
*F16K 1/38*    (2006.01)
*F16K 33/00*    (2006.01)

(52) U.S. Cl.
CPC ............... *F16K 31/26* (2013.01); *F16K 1/38* (2013.01); *F16K 15/026* (2013.01); *F16K 33/00* (2013.01); *Y10T 137/7465* (2015.04)

(58) Field of Classification Search
CPC .......... F16K 31/26; F16K 1/38; F16K 15/026; F16K 33/00; F16K 24/048; F16K 31/18; F16K 31/20; F16K 31/22; F16K 31/24; Y10T 137/7465; Y10T 137/7485; Y10T 137/7439; G05D 16/12; A01K 7/02; A01K 7/025; A01K 7/04; A01K 39/024

USPC ................. 137/442, 448; 119/74, 77, 78, 80
See application file for complete search history.

(56) References Cited

U.S. PATENT DOCUMENTS

| 1,526,738 | A | * | 2/1925 | Brady ..................... F16K 31/26 |
| | | | | 137/442 |
| 1,548,720 | A | * | 8/1925 | Lewis .................. A01K 39/024 |
| | | | | 119/78 |
| 10,287,153 | B1 | * | 5/2019 | Langiano ............. B67D 3/0003 |
| 2005/0051214 | A1 | * | 3/2005 | Chan ........................ F16K 31/34 |
| | | | | 137/413 |
| 2006/0174838 | A1 | * | 8/2006 | Plante ...................... A01K 7/02 |
| | | | | 119/74 |
| 2013/0081699 | A1 | * | 4/2013 | Zhou ..................... F24C 15/003 |
| | | | | 137/1 |

* cited by examiner

*Primary Examiner* — Craig J Price
(74) *Attorney, Agent, or Firm* — JCIP Global Inc.

(57) ABSTRACT

An automatic water regulator includes a water tank component and a base component disposed thereunder. The water tank component includes a box body, a water inlet arranged in a middle portion of the box body, a spring, a sealing ring, an ejector rod sleeved by the spring and inserted into an intermediate position of the water inlet, an ejector shaft, a tray disposed on a side of the ejector rod, a floating bucket disposed at a bottom portion of the box body and away from the side of the ejector rod, and a floating bucket shaft disposed on a middle portion of the floating bucket. The base component includes a main base body and a supporting rib therein and below the tray. The sealing ring is disposed on top of the ejector rod. A bottom end of the ejector rod is connected to the floating bucket.

6 Claims, 4 Drawing Sheets

AUTOMATIC WATER REGULATOR

CROSS-REFERENCE TO RELATED APPLICATIONS

This application claims the priority benefit of China Application Serial No. 201820109137.4 filed on Jan. 23, 2018. The entirety of the above-mentioned patent application is hereby incorporated by reference herein and made a part of this application.

BACKGROUND

Field of the Invention

The present invention relates to a regulating valve, and more particularly to an automatic water regulator, which belongs to the field of water inlet valve equipment.

Background Art

A water tank is one of the common parts of mechanical equipment, and its performance and excellent work quality have a huge impact on production. Therefore, a regulator is one of the control systems of the water tank, and its development and design are particularly important. Conventionally, the regulating valve and the water tank are sealed structures, or the regulating valve and a sink are sealed structures. An air pressure difference principle of a sealed space is used to adjust inlet water and outlet water, so that dirt and accumulated water generated inside the water tank and the sink are difficult to be cleaned and treated. Moreover, a water valve and the water tank are connected by screws. When daily installing and cleaning, manual screwing is required to install and disassemble for cleaning, which is very inconvenient, and workload of the user is increased.

Therefore, a research object of the present invention is to provide a regulator which is simple in structure, convenient in installation and disassembly, and easy to clean inside.

SUMMARY

In view of the above technical deficiencies, the present invention provides an automatic water regulator, which realizes automatic switching through cooperation of the floating bucket, the sealing ring, and the spring, and it eliminates cumbersome structure, has a stable working state and is easy to clean.

In order to solve the above technical problems, the technical solution adopted by the present invention is as follows.

In one embodiment of the present application, an automatic water regulator, comprising a water tank component and a base component. The water tank component comprises a box body, a water inlet, a spring, a sealing ring, an ejector rod, an ejector shaft, a tray, a floating bucket, and a floating bucket shaft. The base component comprises a main base body and a supporting rib. The box body has a side wall and a bottom wall connected to the side wall. The water inlet is arranged in a middle portion of the box body, and the middle portion protrudes from the bottom wall away from the side wall. The ejector rod is vertically inserted into an intermediate position of the water inlet. The sealing ring is disposed on a top portion of the ejector rod. The tray is disposed on a side of the ejector rod. The spring is circumferentially disposed outside the ejector rod. The floating bucket is disposed at a bottom portion of the box body and away from the side of the ejector rod. The floating bucket shaft is disposed on a middle portion of the floating bucket. A bottom end of the ejector rod is connected to the floating bucket by the ejector shaft. The base component is disposed under the water tank component. The base body is disposed in a substantially U-shaped structure. The supporting rib is disposed inside the base body and directly below the tray.

In one embodiment of the present application, a material of the sealing ring is selected from a silica gel or a rubber material.

In one embodiment of the present application, the water tank component is matched with the base component.

In one embodiment of the present application, a diameter size of the ejector rod is less than a diameter size of the water inlet.

In one embodiment of the present application, a diameter size of the sealing ring is less than the diameter size of the water inlet.

In one embodiment of the present application, the water tank component and the base component are detachably arranged.

A beneficial effect of the present invention: simple structure, easy to use, easy to clean, and effectively improve the efficiency of automatic water regulation.

DETAILED DESCRIPTION OF THE EMBODIMENTS

Figure 1:
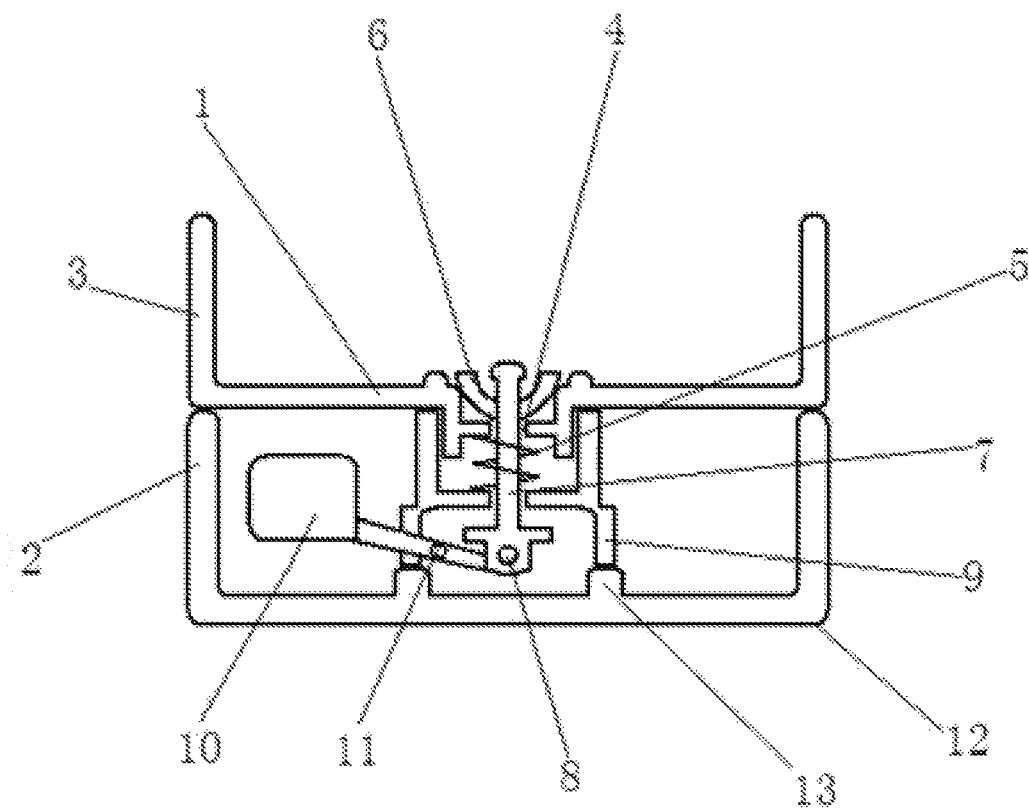
FIG. 1 is a schematic view showing a structure of the present invention when sealing water.

To give the technicians in this field a better understanding of the technical scheme of the present invention, further analysis is made in combination with FIGS. 1 to 4 below.

An automatic water regulator comprises a water tank component 1 and a base component 2. The water tank component 1 comprises: a box body 3, a water inlet 4, a spring 5, a sealing ring 6, an ejector rod 7, an ejector shaft 8, and a tray 9, a floating bucket 10, a floating bucket shaft 11. The base component 2 comprises a main base body 12, a supporting rib 13. The box body 3 has a side wall and a bottom wall connected to the side wall. The water inlet 4 is arranged in a middle portion of the box body 3, and the middle portion protrudes from the bottom wall away from the side wall. To ensure that a water flow can smoothly flow from a gap between the ejector 7 and the water inlet 4, the ejector rod 7 is vertically inserted into an intermediate position of the water inlet 4, and a diameter size of the ejector 7 is less than a diameter size of the water inlet 4. The sealing ring 6 is disposed on a top portion of the ejector rod 7. To ensure better sealing effect, a material of the sealing ring 6 is selected from a silica gel or a rubber material. To ensure that the sealing ring 6 can block the water inlet 4 when sealing water and prevent water from entering the inlet 4, a diameter size of the sealing ring 6 is less than the diameter size of the water inlet 4. The tray 9 is disposed on a side of the ejector rod 7. The spring 5 is circumferentially disposed outside the ejector rod 7. The floating bucket 10 is disposed at a bottom of the box body 1 and away from the side of the ejector rod 7. The floating bucket shaft 11 is disposed on a middle portion of the floating bucket 10. A bottom end of the ejector rod 7 is connected to the floating bucket 10 by the ejector shaft 8. The base component 2 is disposed under the water tank component 1, and the water tank component 1 is matched with the base component 2. The water tank component 1 and the base component 2 are detachably arranged for easy cleaning. The base body 12 is disposed in a substantially U-shaped structure. The supporting rib 13 is disposed inside the base body 12 and directly below the tray 9.

First Embodiment

When the present invention needs to seal water, as shown in FIG. 1, the supporting rib 13 on the base component 2 abuts against the tray 9 to overcome an elastic force of the spring 5, so that an up-and-down movement of the ejector rod 7 is completely controlled by the leverage action of the floating bucket 10. When a water level rises to a certain height, the ejector rod 7 is pulled down, so that the sealing ring 6 disposed to the ejector rod 7 seals the water inlet 4, and the water flow will not pass through the water inlet 4 and flow down, so as to seal the water.

Second Embodiment

Figure 2:
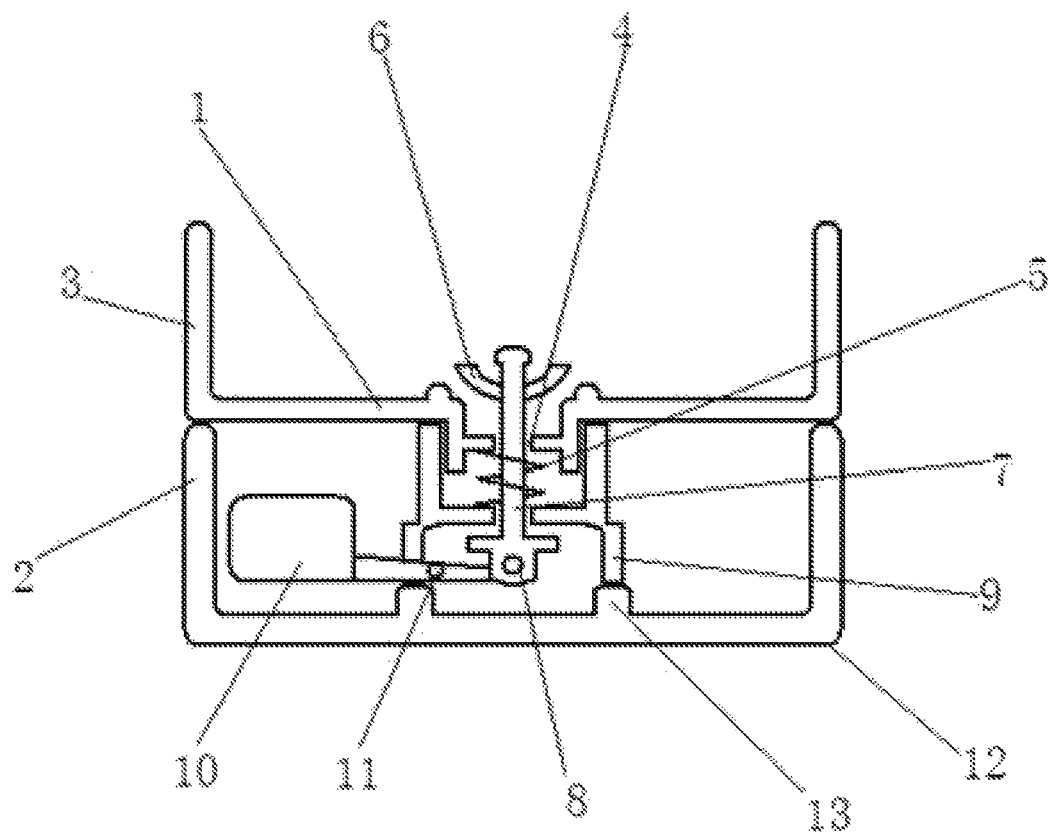
FIG. 2 is a schematic view showing the structure of the present invention when replenishing water.

When the present invention needs to replenish water, as shown in FIG. 2, the water level drops to a certain height, and the floating bucket 10 sinks and the ejector rod 7 is pulled up, so that the sealing ring 6 disposed to the ejector rod 7 leaves the water inlet 4, and the water automatically flows down through the water inlet 4, so as to replenish water.

Third Embodiment

Figure 3:
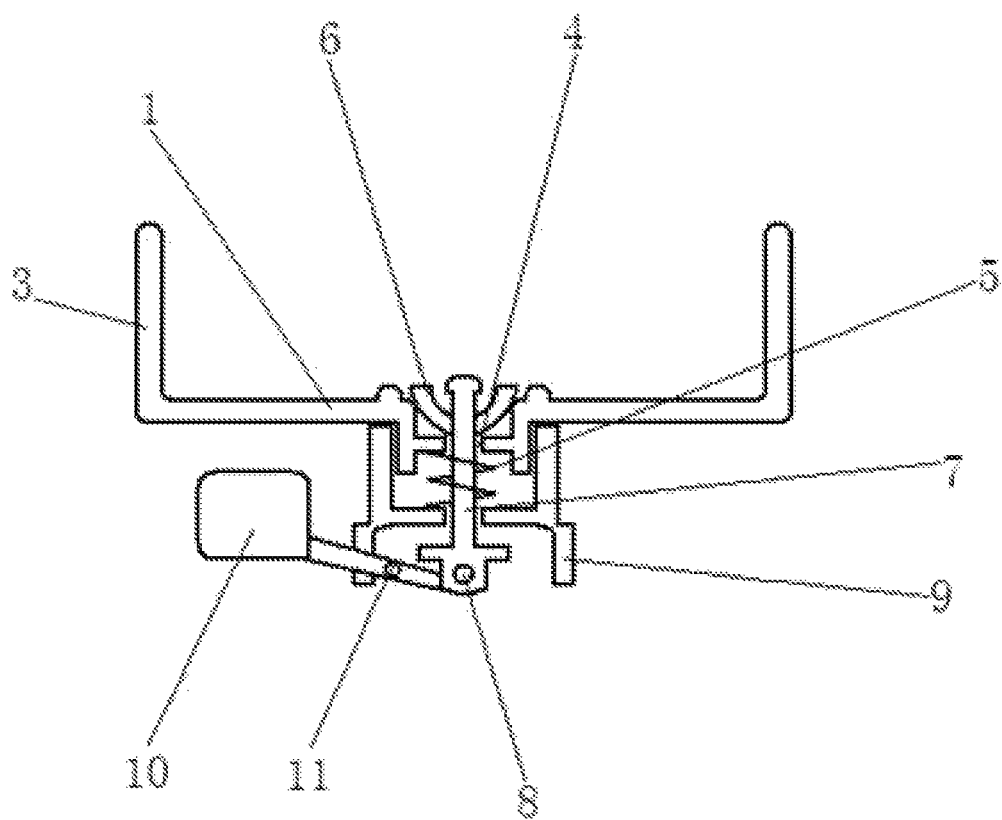
FIG. 3 is a schematic structural view of a water tank component of the present invention.
Figure 4:
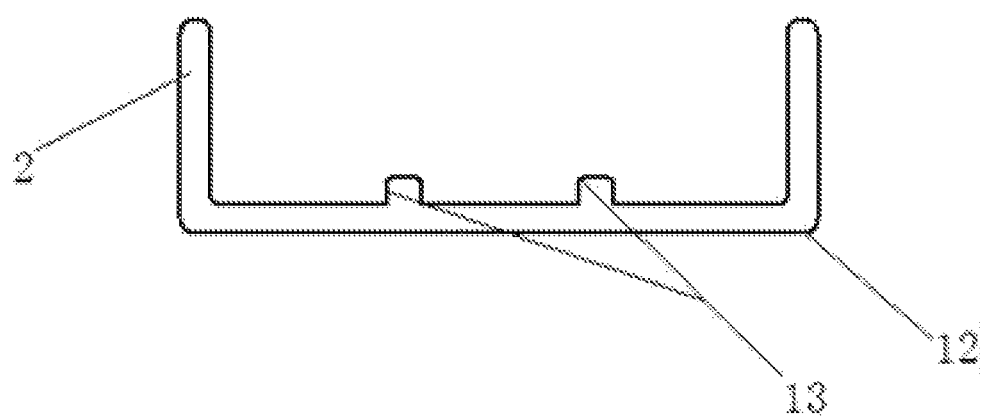
FIG. 4 is a schematic structural view of a base component of the present invention.

When the present invention needs cleaning, as shown in FIGS. 3 and 4, the water tank component 1 and the base component 2 are separated, which is convenient for users to clean the water tank component 1 and the base component 2 respectively. When the water tank component 1 is lifted from the base component 2, the spring 5 presses against the tray 9, the self-weight of the floating bucket 10 makes the ejector rod 7 move upward under the leverage action, and the tray 9 presses the ejector rod 7 to overcome the upward force generated from the floating bucket 10, so that the sealing ring 6 disposed to the ejector rod 7 still remains sealed, and the water will not flow down.

The present invention realizes automatic switching by cooperation of the floating bucket, the sealing ring, and the spring, and eliminates cumbersome structure. The automatic water regulator of the present invention has a stable working state and is easy to clean. The structure of the present invention is simple, convenient to use, and effectively improves efficiency of automatic water regulation.

The technical scheme provided by the present invention is described in detail above. The principles and implementations of the present invention are described in the embodiments. The description of the above embodiments is only used to help understand the method and core ideas of the present invention. For the technicians in this field, the details of the present invention and the scope of the application will be changed according to the idea of the present invention. In summary, the content of the embodiments should not be construed as a limitation of the present invention.

What is claimed is:

1. An automatic water regulator, comprising: a water tank component and a base component, wherein the water tank component comprises a box body, a water inlet, a spring, a sealing ring, an ejector rod, an ejector shaft, a tray, a floating bucket, and a floating bucket shaft; the base component comprises a main base body and a supporting rib; the box body has a side wall and a bottom wall connected to the side wall; the water inlet is arranged in a middle portion of the box body, and the middle portion protrudes from the bottom wall away from the side wall; the ejector rod is vertically inserted into an intermediate position of the water inlet; the sealing ring is disposed on a top portion of the ejector rod; the tray is disposed on a side of the ejector rod; the spring is circumferentially disposed outside the ejector rod, the floating bucket is disposed at a bottom portion of the box body and away from the side of the ejector rod; the floating bucket shaft is disposed on a middle portion of the floating bucket; a bottom end of the ejector rod is connected to the floating bucket by the ejector shaft, the base component is disposed under the water tank component; the base body is disposed in a substantially U-shaped structure; the supporting rib is disposed inside the base body and directly below the tray.

2. The automatic water regulator according to claim 1, wherein a material of the sealing ring is selected from a silica gel or a rubber material.

3. The automatic water regulator according to claim 1, wherein the water tank component is matched with the base component.

4. The automatic water regulator according to claim 1, wherein a diameter size of the ejector rod is less than a diameter size of the water inlet.

5. The automatic water regulator according to claim 1, wherein a diameter size of the sealing ring is larger than a diameter size of the water inlet.

6. The automatic water regulator according to claim 1, wherein the water tank component and the base component are detachably arranged.

\* \* \* \* \*